United States Patent [19]

Sato

[11] Patent Number: 5,469,427
[45] Date of Patent: Nov. 21, 1995

[54] TRANSMISSION LINE CONTROL SYSTEM AND INTERFACE UNIT THEREFOR

[75] Inventor: Kazumi Sato, Kawasaki, Japan

[73] Assignee: Fujitsu Limited, Kanagawa, Japan

[21] Appl. No.: 218,126

[22] Filed: Mar. 25, 1994

[30] Foreign Application Priority Data

Sep. 20, 1993 [JP] Japan .................. 5-233099

[51] Int. Cl.⁶ .................. H04J 3/14; G06F 11/00
[52] U.S. Cl. .................. 370/16; 395/750; 395/838
[58] Field of Search .................. 340/825.06, 825.18; 370/13, 16, 58.1, 58.2, 85.1; 371/8.1, 8.2, 9.1, 11.1, 11.2, 11.3

[56] References Cited

U.S. PATENT DOCUMENTS

| | | | |
|---|---|---|---|
| 4,455,645 | 6/1984 | Mijioka et al. | 370/16 |
| 4,658,396 | 4/1987 | Barden | 370/16 |
| 4,700,348 | 10/1987 | Ise et al. | 371/8.2 |
| 5,146,453 | 9/1992 | Nagler et al. | 370/16 |
| 5,218,600 | 6/1993 | Schenkyr et al. | 371/8.2 |

*Primary Examiner*—Alpus Hsu

[57] ABSTRACT

A transmission line control system is adapted to a communication system having a redundant configuration and including transmission apparatuses which are coupled via transmission lines of a working system and a protection system. Each of the transmission apparatuses includes an interface board with respect to each of the working and protection systems. The interface board includes a transmission line signal processor which processes signals exchanged with the transmission line and an apparatus interface which provides an interface between the transmission apparatus and the transmission line signal processor. The transmission line control system includes a process stop controller, provided in each interface board, stopping processes in the apparatus interface, and a mechanism for operating the process stop controller of the interface board in the protection system at each of the transmission apparatuses, so that power consumption is reduced.

14 Claims, 11 Drawing Sheets

TRANSMISSION LINE CONTROL SYSTEM AND INTERFACE UNIT THEREFOR

BACKGROUND OF THE INVENTION

The present invention relates to systems for controlling transmission lines in a redundant system and interface units therefor, and more particularly to a system for controlling transmission lines connected to a transmission apparatus having a redundant configuration such as a multiplex transmission apparatus.

In transmission apparatuses such as a multiplex transmission apparatus or a cross connect apparatus having an optical interface, the quality of transmitting information is secured by means of a redundant transmission system.

In the transmission apparatus employing the redundant configuration which includes transmission lines forming a working (or main) system and a protection (or sub) system, there is a demand to reduce the power consumption of the transmission apparatus as a whole by reducing the power consumption of the unused protection system in an optical interface board.

FIG. 1 shows an example of redundant configuration of a transmission system which comprises transmission apparatuses 11 and 12 connected via optical transmission lines 13 and 14. The transmission apparatus 11 includes optical interface boards 15 and 17 which are respectively connected to optical interface boards 16 and 18 of the transmission apparatus 12 via the optical transmission lines 13 and 14. As may be seen from FIG. 1, selectors 19 and 20 are operated so that the corresponding pair consisting of the optical interface boards 15 and 16 are used as the working system and the pair consisting of the optical interface boards 17 and 18 are used as the protection system, or vice versa.

FIG. 2 shows the construction of an example of a conventional optical interface board which receives an optical signal having a transmission speed of 150 Mbit/s or 50 Mbit/s from a transmission line. The optical interface board includes: an opto-electric (O/E) converter 21 for converting an optical signal into an electrical signal, an electro-optic (E/O) converter 22 for converting an electrical signal into an optical signal, a transmission line signal processor 23 for processing transmission line signals which are exchanged, and an apparatus interface 24 for providing an interface between the transmission line signal processor 23 and a transmission apparatus (not shown). The illustration of a power supply and a clock generator is omitted in FIG. 2.

In the transmission line signal processor 23, a received signal from the O/E converter 21 is subjected to a frame synchronization detection of the input signal in a frame synchronization unit 25, subjected to an error detection of the input signal in a transmission line error detector 26, subjected to an overhead detection of the input signal in an overhead detection unit 27, and is subjected to a pointer detection of the input signal in a pointer detection unit 28. Thereafter, the signal from the transmission signal line processor 23 is supplied to the transmission apparatus via the apparatus interface 24.

A transmitting signal from the transmission apparatus is input to the transmission line signal processor 23 via the apparatus interface 24. The pointer adding unit 29 adds a pointer to the output signal, and an overhead adding unit 30 adds an overhead to the output signal. A transmission line error detection signal is added into the output signal in a transmission line error detection signal adding unit 31. The E/O converter 22 then converts the output signal into an optical signal which is supplied to the transmission line.

Referring to FIG. 1, the optical interface boards in the working system and the protection system are both supplied with power at all times. This means that when there are equal numbers of working optical interface boards and protection optical interface boards, the power consumed by the protection optical interface boards amounts to half the total power consumption of all the optical interface boards.

Thus, a problem with the conventional transmission apparatus is that the protection optical interface boards are supplied with power at all times, and that they are always activated for transmission line signal processing in the same manner as their counterparts in the working system. The reduction in the power consumption in a protection interface board is possible if the processing within the protection optical interface board can be reduced compared to that of the working optical interface board. This then would result in the reduction of power consumption of the transmission apparatus as a whole. Conventionally, however, no such proposal has been made.

SUMMARY OF THE INVENTION

Accordingly, it is a general object of the present invention to provide a novel and useful transmission line control system and an interface unit therefor, in which the problems described above are eliminated.

Another and more specific object of the present invention is to reduce power consumption of the transmission apparatus which has a redundant configuration including protection optical interface boards in addition to working optical interface boards, by reducing the amount of processes performed by the protection optical interface boards to thereby reduce the total power consumption.

Another and more specific object of the present invention is to provide a transmission line control system adapted to a communication system having a redundant configuration and including transmission apparatuses which are coupled via transmission lines of a working system and a protection system, where each of the transmission apparatuses include an interface board with respect to each of the working and protection systems, the interface board includes a transmission line signal processor which processes signals exchanged with the transmission line and an apparatus interface which provides an interface between the transmission apparatus and the transmission line signal processor, and the transmission line control system comprises a process stop controller, provided in each interface board, stopping processes in the apparatus interface, and means for operating the process stop controller of the interface board in the protection system at each of the transmission apparatuses, so that power consumption is reduced. According to the transmission line control system of the present invention, it is possible to reduce the power consumption of the transmission apparatus as a whole configured to include protection optical interface boards as well as working optical interface boards, by stopping the operation of the apparatus interface of the protection optical interface board and thus reducing power consumption of the protection optical interface board.

Still another object of the present invention is to provide an interface unit adapted to a transmission apparatus of a communication system having a redundant configuration such that a plurality of transmission apparatuses are coupled via transmission lines of a working system and a protection system, comprising a transmission line signal processor processing signals exchanged with the transmission line, and an apparatus interface providing an interface between the transmission apparatus and the transmission line signal processor, and a process stop controller stopping processes in the apparatus interface when the interface unit belongs to the protection system, so that power consumption is reduced. According to the interface unit of the present invention, it is possible to reduce the power consumption of the transmission apparatus as a whole configured to include protection optical interface boards as well as working optical interface boards, by stopping the operation of the apparatus interface of the protection optical interface board and thus reducing power consumption of the protection optical interface board.

Other objects and further features of the present invention will be apparent from the following detailed description when read in conjunction with the accompanying drawings.

DESCRIPTION OF THE PREFERRED EMBODIMENTS

The present invention relates to a transmission line control system which is applied to a communication system having a redundant configuration wherein transmission apparatuses having a working system and a protection system are connected via transmission lines of the working system and the protection system. Each of the working system and the protection system have an interface board provided with a transmission line signal processor for exchanging signals with the transmission line, and an apparatus interface for providing an interface between the transmission apparatus and the transmission line signal processor. In the present invention, each interface board is provided with a power consumption reducing processor for reducing the power consumption by stopping the process within the apparatus interface. The power consumption is reduced by activating the power consumption reducing processor of the interface board in the protection system in each transmission apparatus.

The aforementioned power consumption reducing processor may be formed by a power supply controller for controlling the power supply to the apparatus interface. In this case, the power supply controller cuts off the power supply to the apparatus interface when the power consumption reducing processor belongs to the interface board in the protection system.

The aforementioned power supply controller may include a relay which operates when a working/protection judging signal indicates the protection system. In this case, the operation of the relay causes the power supply to the apparatus interface to be cut off.

The aforementioned power supply controller may include an analog switch which operates when the working/protection judging signal indicates the protection system. In this case, the operation of the analog switch causes the power supply to the apparatus interface to be cut off.

The aforementioned power consumption reducing processor may be formed by a clock supply controller for controlling the supply of a clock to the apparatus interface. In this case, the clock supply controller stops the supply of the clock to the apparatus interface when the clock supply controller belongs to the interface board in the protection system.

The aforementioned clock supply controller may include a selector which operates when the working/protection judging signal indicates the protection system. In this case, the operation of the selector causes the supply of the clock to the apparatus interface to be cut off.

Figure 3:
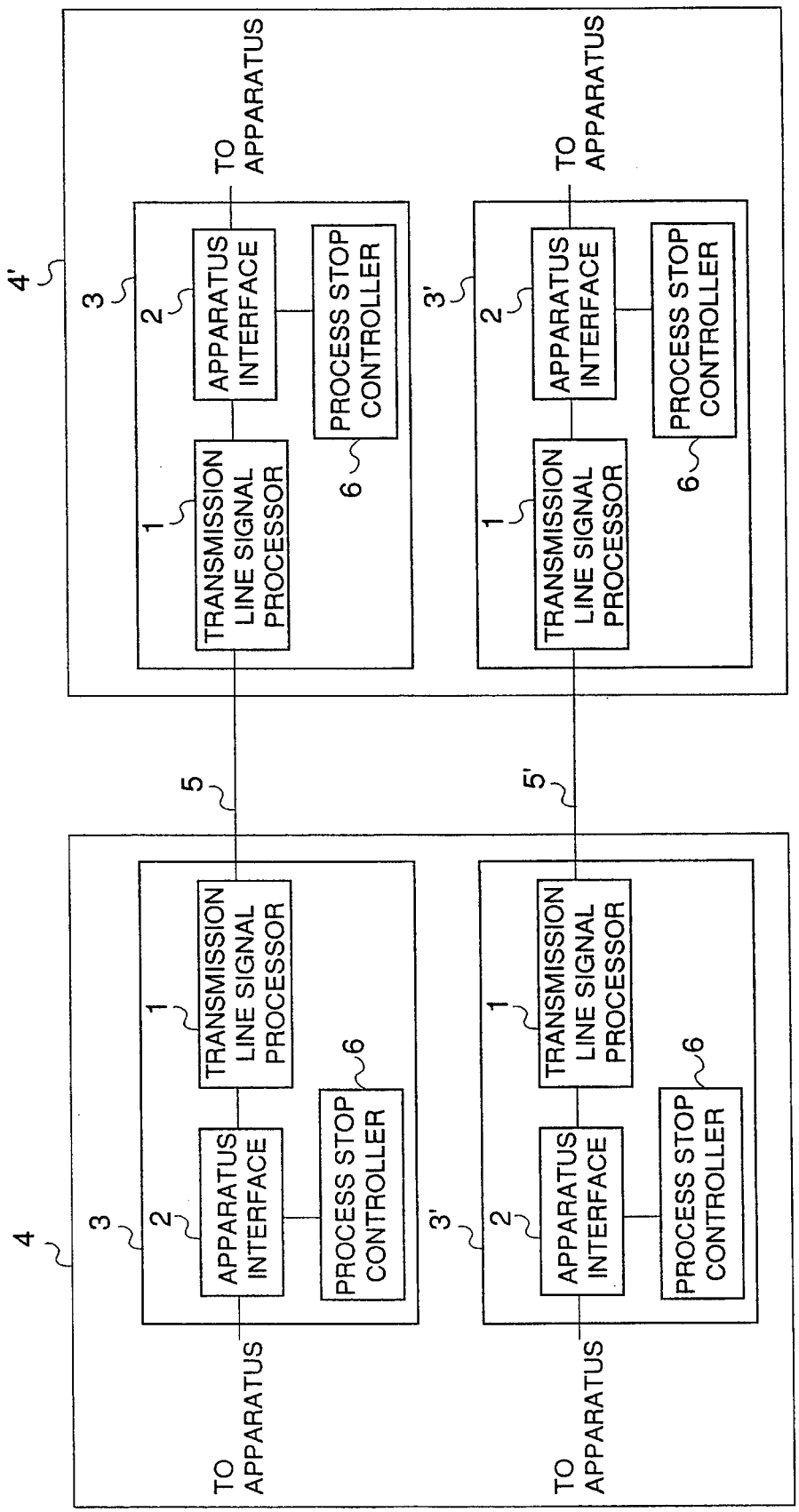
FIG. 3 is a block diagram for explaining the operation of the present invention.

FIG.3 is a block diagram for explaining the operating principle of the present invention. Referring to a redundant configuration of FIG. 3, transmission apparatuses 4 and 4' are connected to each other via transmission lines 5 and 5', one of the lines 5 and 5' being used in the working system and the other being used in the protection system. The transmission apparatuses 4 and 4' respectively include interface boards 3 and 3', one of the boards 3 and 3' being used in the working system and the other being used in the protection system. Each of the interface boards 3 and 3' include a transmission line signal processor 1 and which processes signals exchanged with the transmission line, and an apparatus interface 2 for providing an interface between the transmission apparatus and the transmission line signal processor 1.

Each interface board is provided with a process stop controller 6 for stopping processes in the apparatus interface 2. The power consumption of the protection interface board is reduced by operating the process controller 6 in each transmission apparatus.

Thus, the present invention makes it possible to reduce the power consumption of the redundantly configured transmission apparatus as a whole including working and protection interface boards, by reducing the power consumption of the protection boards.

The process stop controller 6 may be formed by a power supply controller 33 for controlling power supply to the apparatus interface 2. In this case, the power to be supplied to the apparatus interface 2 of the protection interface board is cut off by the power supply controller 33 so that the process in the apparatus interface 2 is stopped.

The power supply controller 33 may be equipped with a relay 34 which is operated so as to cut off the power supply to the apparatus interface 2 when a working/protection judging signal indicates the protection system.

The power supply controller 33 may be equipped with an analog switch which is operated so as to cut off the power supply to the apparatus interface when the working/protection judging signal indicates the protection system.

The aforementioned process stop controller 6 may be formed by a clock supply controller 37 for controlling the supply of a clock to the apparatus interface 2. In this case, the clock to be supplied to the apparatus interface 2 is cut off by the clock supply controller 37 so that the process in the apparatus interface 2 is stopped when the interface board is of the protection system.

The clock supply controller 37 may be equipped with a selector 38 which is operated when the working/protection judging signal indicates the protection system. In this case, the clock to be supplied to the apparatus interface 2 is cut off by the selector 38.

Figure 1:
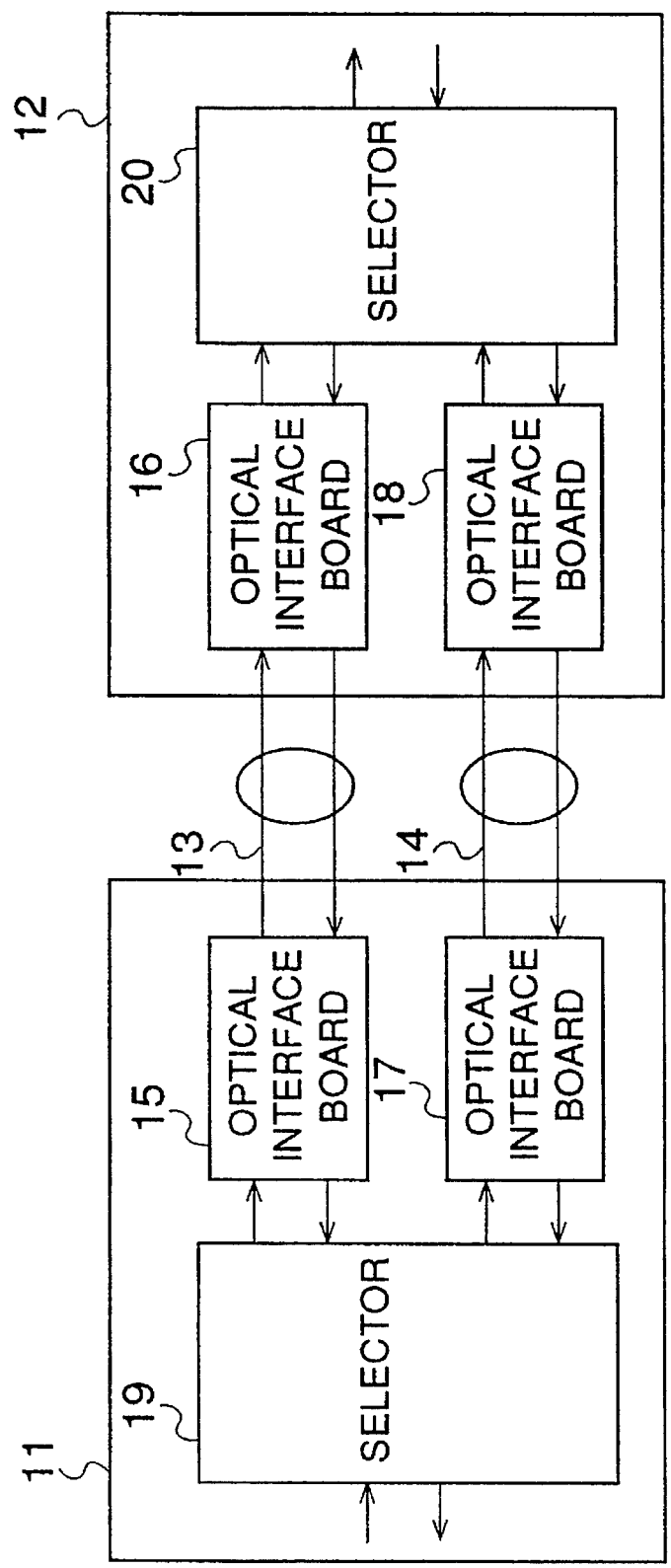
FIG. 1 shows the configuration of an example of a transmission system having a redundant configuration.
Figure 2:
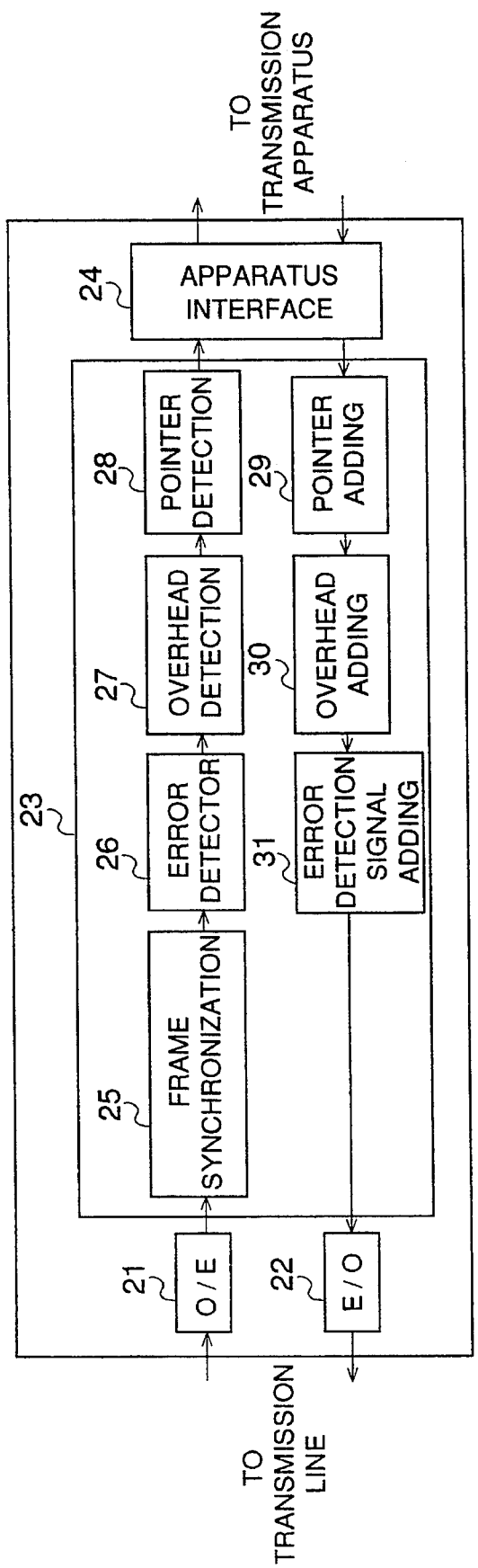
FIG. 2 shows the construction of an example of a conventional optical interface board.
Figure 4:
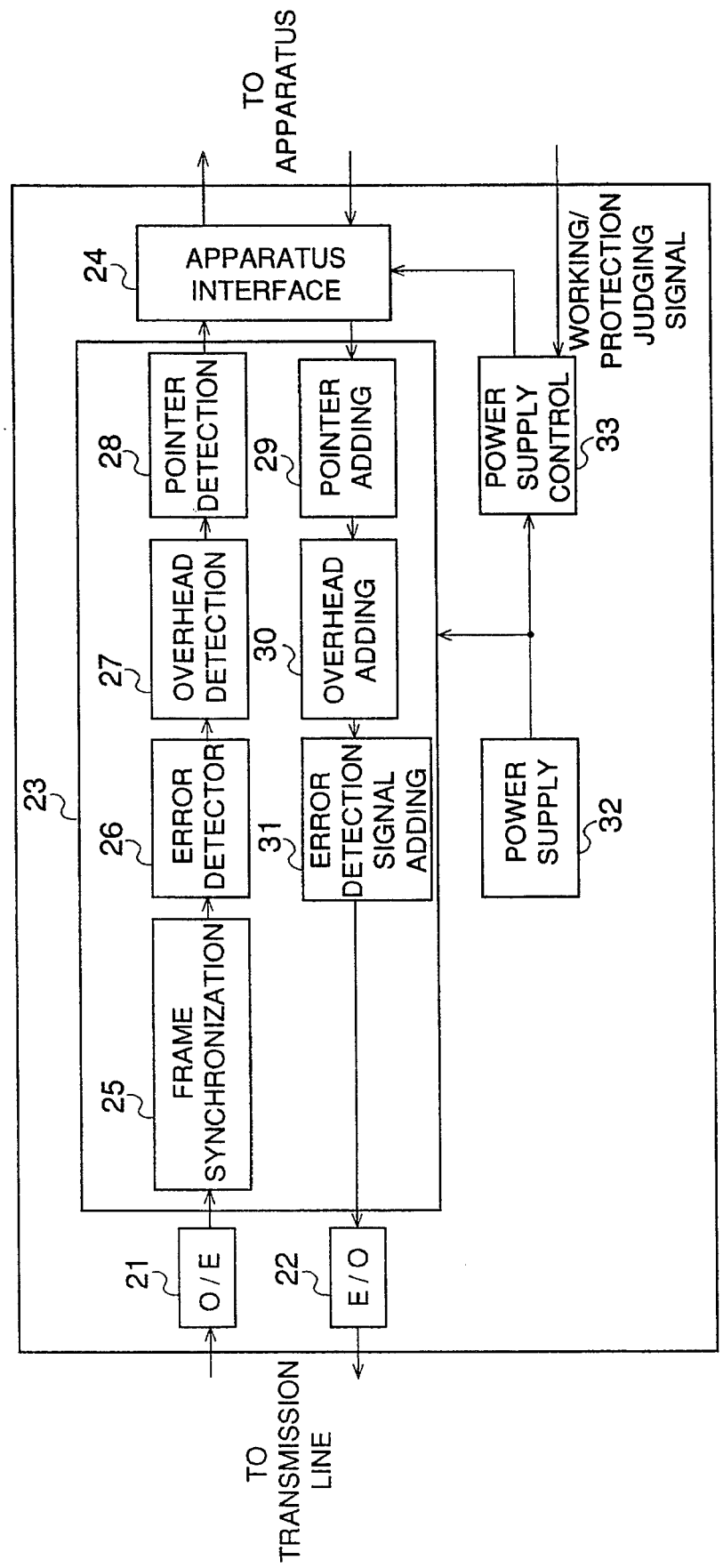
FIG. 4 is a system block diagram showing a first embodiment of the present invention.

FIG. 4 shows a first embodiment of the present invention. In FIG. 4, those parts that are the same as the parts of FIG. 2 are designated by the same reference numerals, and a description thereof will be omitted. A power supply 32 for supplying power to the entire optical interface board, and a power supply controller 33 for controlling the power supply to an apparatus interface 24 in the optical interface board are provided in this embodiment.

In the optical interface board, the transmission line signal processor 23 has an LSI structure with the elements such as those shown in FIG. 2, for example. Hence, even when the optical interface board is used in the protection system, the operation of the optical interface board cannot be stopped. Therefore, the transmission line signal processor 23 is constructed to constantly receive power from the power supply 32.

On the other hand, the operation of the apparatus interface 24 may be stopped when it is used in the protection system. Responsive to an external working/protection judging signal which indicates whether the optical interface board is in the working system or the protection system, the power supply controller 33 supplies power to the apparatus interface 24 from the power supply 32 when the optical interface board is used in the working system, but supplies no power to the apparatus interface 24 when the corresponding optical interface board is used in the protection system.

Because the power supply to the apparatus interface 24 is stopped when the optical interface board is used in the protection system, the embodiment shown in FIG. 4 can reduce the power consumption of the protection optical interface board is reduced so that the power consumption of the transmission apparatus as a whole can be reduced.

Figure 5:
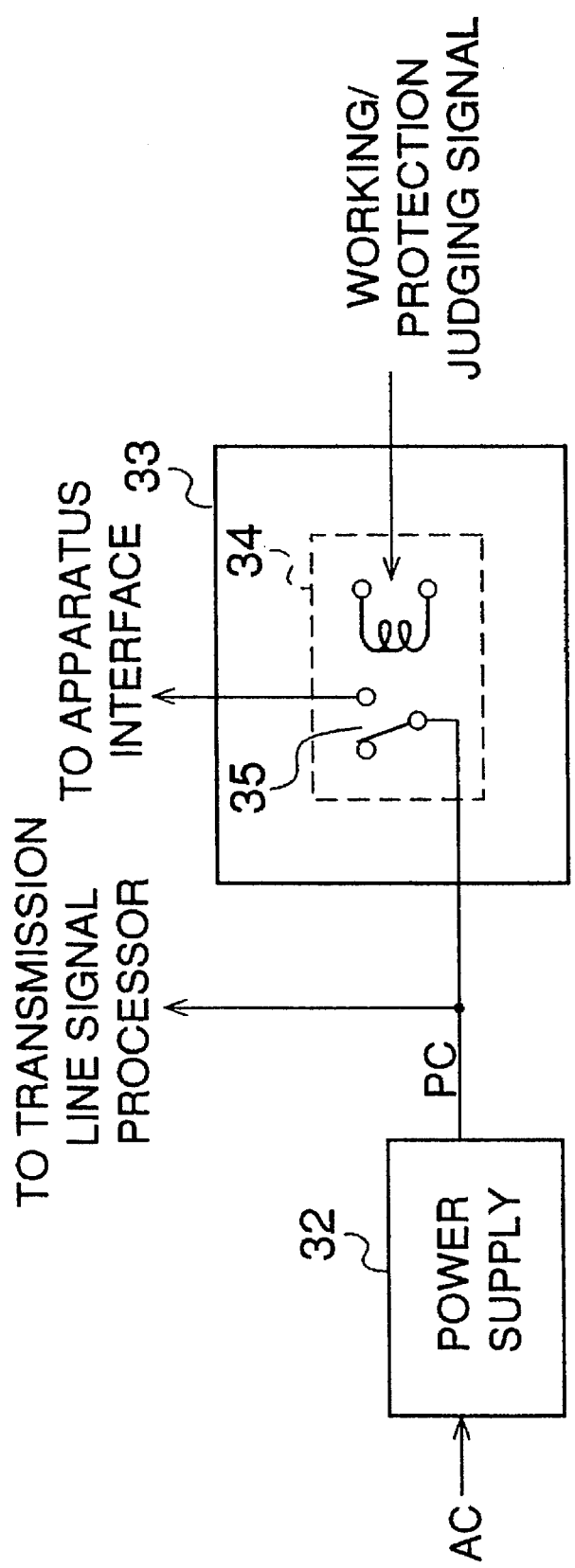
FIG. 5 is a block diagram showing the construction of a power supply controller.

FIG. 5 shows the construction of the power supply controller 33. The power supply 32 comprises, for example, an AC/DC converter, and generates a DC power to be supplied to the optical interface board from a commercial AC power supply. The power supply controller 33 includes the relay 34 which operates responsive to the working/protection judging signal. When the working/protection judging signal indicates the working system, a contact 35 of the relay 34 is closed so that the DC power is supplied from the power supply 32 to the apparatus interface 24. When the working/protection judging signal indicates the protection system, the contact 35 is open so that the DC power is not supplied from the power supply 32 to the apparatus interface 24. The relay 34 may be replaced by an analog switch.

Figure 6:
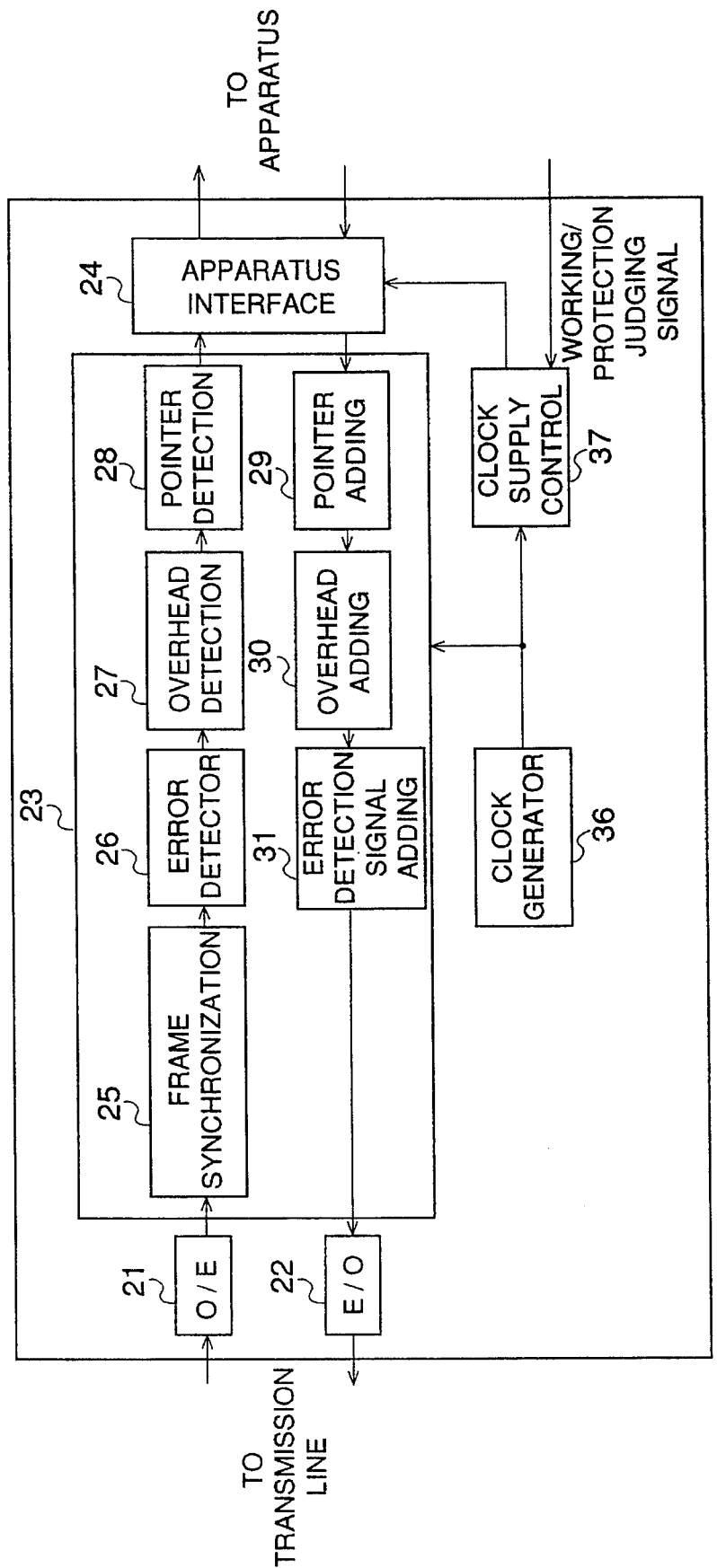
FIG. 6 is a system block diagram showing a second embodiment of the present invention.

FIG. 6 shows a second embodiment of the present invention. Those parts that are the same as the parts of FIG. 2 are designated by the same reference numerals, and a description thereof will be omitted. A clock generator 36 supplies a clock to the entire optical interface board, and a clock supply controller 37 controls the supply of the clock to the apparatus interface 24 in the optical interface board.

As described above, the operation of the transmission line signal processor 23 cannot be stopped even if the optical interface board is used in the protection system. Therefore, the transmission line signal processor 23 is constructed to constantly receive the clock from the clock generator 36.

On the other hand, the operation of the apparatus interface 24 may be stopped when it is used in the protection system. Responsive to the external working/protection judging signal, the clock supply controller 37 supplies the clock to the apparatus interface 24 from the clock generator 36 when the optical interface board is used in the working system, and supplies no clock to the apparatus interface 24 when the optical interface board is used in the protection system.

Because the supply of the clock to the apparatus interface 24 is stopped when the optical interface board is used in the protection system, the embodiment shown in FIG. 6 can reduce the power consumption of the protection optical interface board so that the power consumption of the transmission apparatus as a whole can be reduced.

Figure 7:
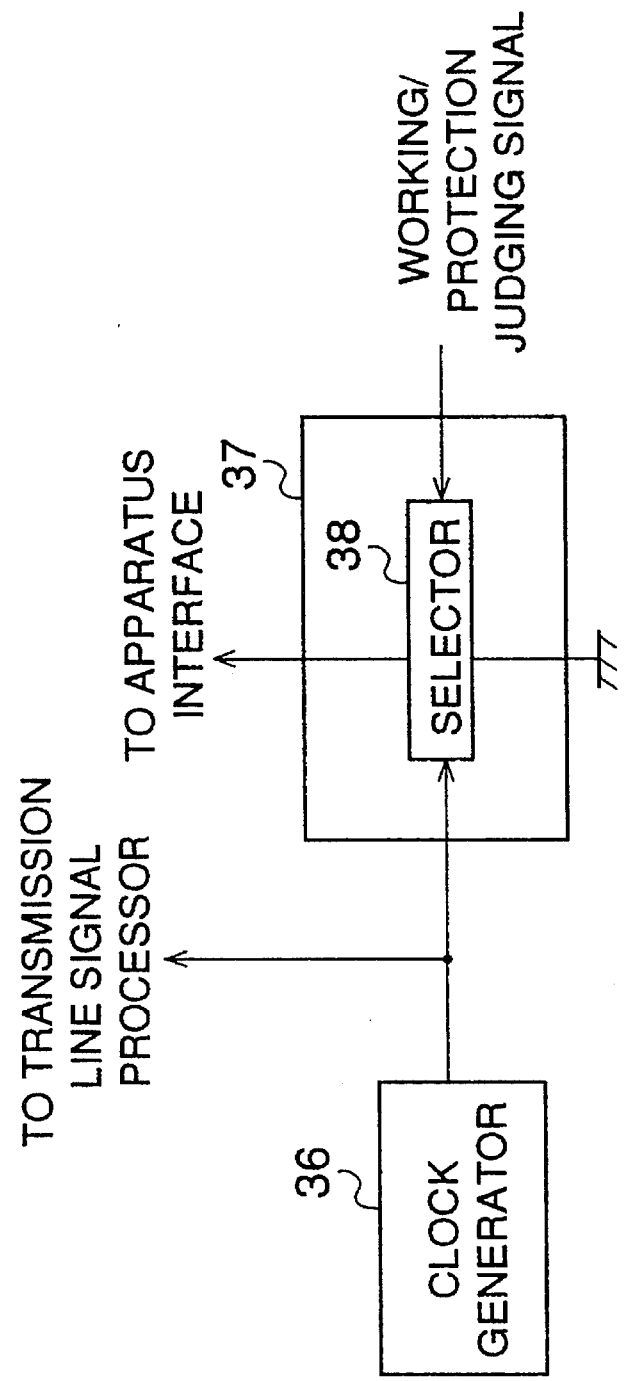
FIG. 7 is a block diagram showing the construction of a clock supply controller.

FIG. 7 shows the construction of the clock supply controller 37. The clock generator 36 generates a clock necessary for the operation of the optical interface board. The clock supply controller 37 has a selector 38 which operates responsive to the working/protection judging signal. When the working/protection judging signal indicates the working system, the selector 38 is turned ON so as to supply the clock from the clock generator 36 to the apparatus interface 24. When the working/protection judging signal indicates the protection system, the selector 38 is turned OFF so that the clock from the clock generator 36 is not supplied to the apparatus interface 24, and the clock line of the apparatus interface 24 is grounded.

Figure 8:
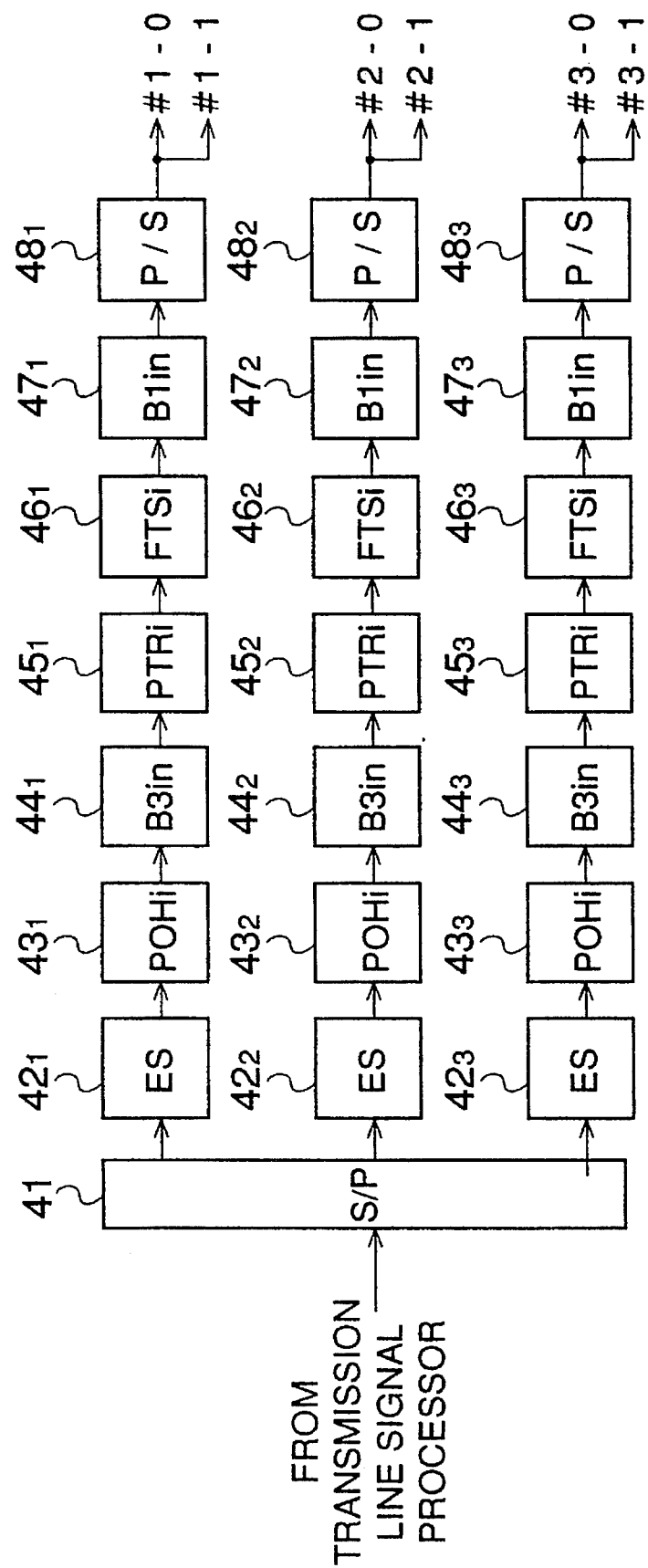
FIG. 8 is a system block diagram showing an embodiment of the construction of a portion of an apparatus interface.

FIG. 8 shows an embodiment of the construction of a portion of the apparatus interface 24 that provides an interface from the transmission line signal processor 23 to the transmission apparatus. Referring to FIG. 8, a serial/parallel (S/P) converter 41, for example, converts an 8-parallel input signal of 25 Mbit/s into 8-parallel signals of 6 Mbit/s in 3 systems.

Elastic memories $42_1$, $42_2$ and $42_3$ temporarily hold the input signals of the respective systems. POH data insertion parts (POHi) $43_1$, $43_2$ and $43_3$ insert path overhead (POH) data into the input signals.

Apparatus error detection signal adding units (B3in) $44_1$, $44_2$ and $44_3$ add a first apparatus error detection signal to the input signals. Apparatus pointer adding units (PTRi) $45_1$, $45_2$ and $45_3$ add an apparatus pointer to the input signals. Frame timing stamp adding units (FTSi) $46_1$, $46_2$ and $46_3$ add frame timing stamp information for determining the frame timing to the input signals.

Apparatus error detection signal adding units (B1in) $47_1$, $47_2$ and $47_3$ add a second apparatus error detection signal to the input signals. Parallel/serial (P/S) converters $48_1$, $48_2$ and $48_3$ convert the 8-parallel input signals of each of the systems into serial signals of 52 Mbit/s, that is, signals #1-0, #2-0 and #3-0 of the 0-system and signals #1—1, #2-1 and #3-1 of the 1-system.

Figure 9:
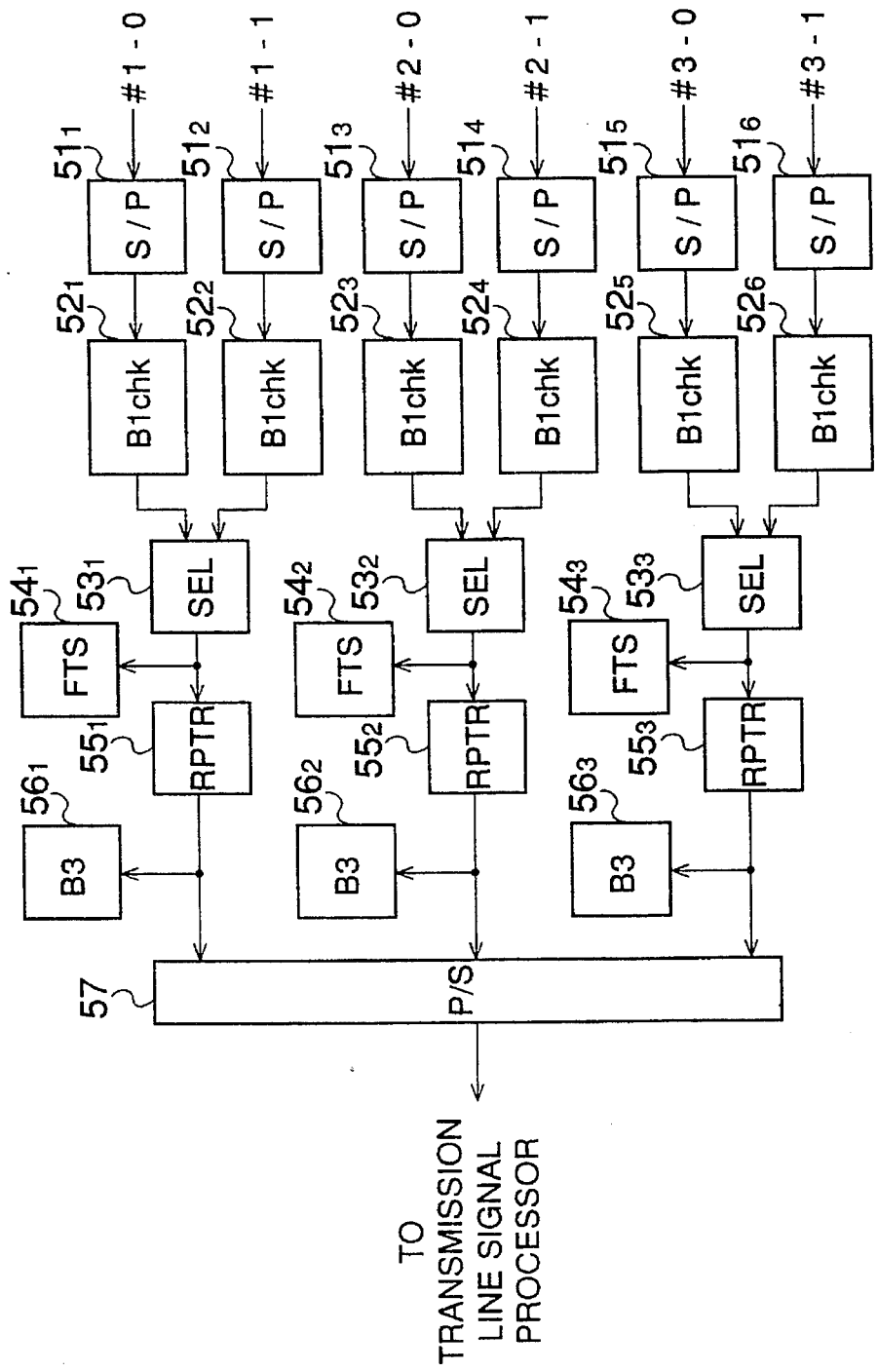
FIG. 9 is a system block diagram showing an embodiment of the construction of another portion of the apparatus interface.

FIG. 9 shows an embodiment of the construction of another portion of the apparatus interface 24 that provides an interface from the transmission apparatus to the transmission line signal processor 23. Serial/parallel (S/P) converters 511, 512, 513, 514, 515 and 516 convert 52 Mbit/s 0-system signals #1-0, #2-0, #3-0 and 52 Mbit/s 1-system signals #1-1, #2-1, #3-1 into 6 Mbit/s 8-parallel signals.

Apparatus error detection signal detecting units (B1chk) $52_1$, $52_2$, $52_3$, $52_4$, $52_5$ and $52_6$ detect the second apparatus error detection signal in the input signals, and each of selectors (SEL) $53_1$, $53_2$ and $53_3$ select and output either the 0-system signals or the 1-system signals. Frame timing stamp detecting units (FTS) $54_1$, $54_2$ and $54_3$ detect the timing stamp the input signals.

Apparatus pointer detection parts (RPTR) $55_1$, $55_2$ and $55_3$ read an apparatus pointer in the input signals. Apparatus error detection signal detecting units (B3) $56_1$, $56_2$ and $56_3$ detect the first apparatus error detection signal in the input signals. A parallel/serial (P/S) converter 57 converts the 8-parallel signals of 6 Mbit/s in 3 systems into 8-parallel signal of 25 Mbit/s.

Figure 10:
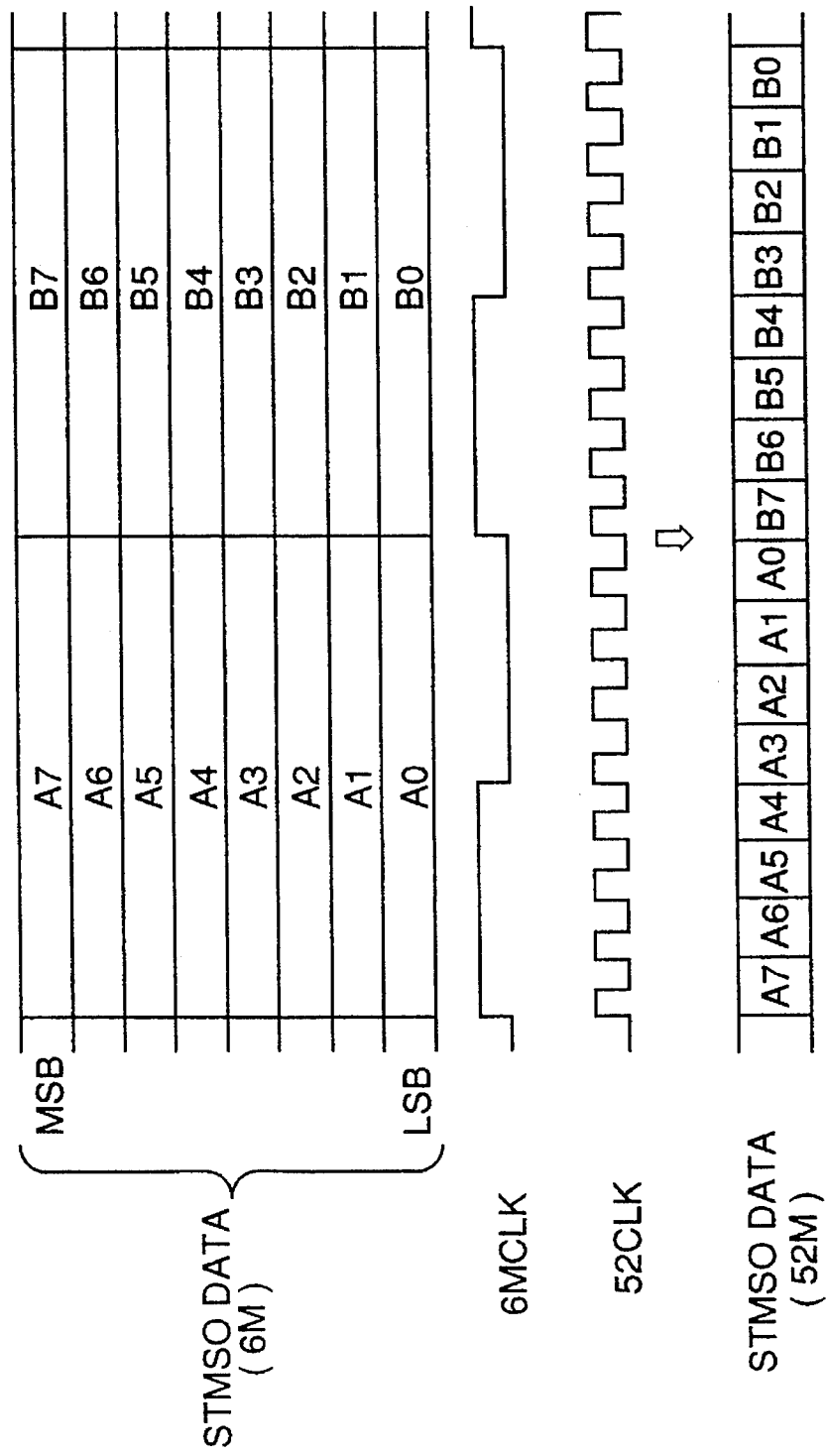
FIG. 10 is a diagram for explaining a parallel/serial conversion in the apparatus interface.

FIG. 10 is a diagram for explaining a parallel/serial conversion in the apparatus interface. FIG. 10 shows a case where the P/S converters $48_1$, $48_2$ and $48_3$ shown in FIG. 8 convert 6 (6.48) Mbit/s STMS0 parallel data into 52 (51.84) Mbit/s serial data.

As shown in FIG. 10, the 8-parallel STMS0 data synchronized to a 6 MHz clock 6MCLK are converted into the STMS0 serial data synchronized to a 52 MHz clock 52MCLK.

Figure 11:
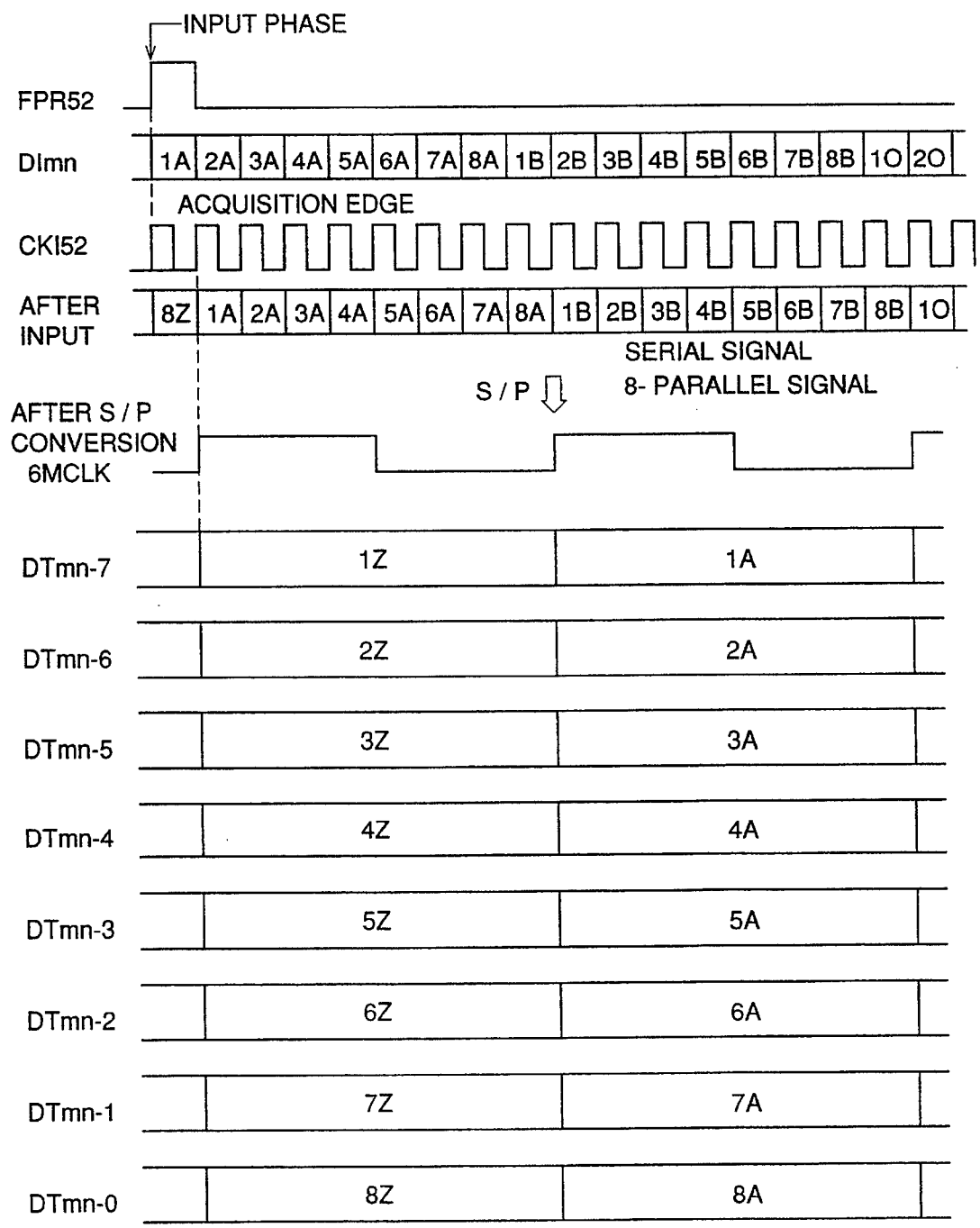
FIG. 11 is a diagram for explaining a serial/parallel conversion in the apparatus interface.

FIG. 11 is a diagram for explaining a serial/parallel conversion in the apparatus interface 24. FIG. 11 shows a case, where the S/P converters $51_1$ through $51_6$ shown in FIG. 9 convert the 52 (51.84) Mbit/s pseudo STM0 serial data on 3HW (highways)×2 channels into the 6 (6.48) Mbit/s 8-parallel signal.

As shown in FIG.11, the data DImn (m=1 to 3, n=A, B) input depending on a frame signal FPR52 is input based on a clock CKI52 having a frequency of 52 MHz. The input frame signal FPRS2 is then synchronized to the 6 MHz clock 6MCLK and converted into 6 MHz 8-parallel data DTmn-7, DTmn-6, . . . , DTmn-0 (m=1 to 3, n=A, B).

As has been described above, the parallel/serial converters and the serial/parallel converters shown in FIG. 8 and FIG. 10 provided in the apparatus interface operate in synchronization with the respective clocks, and cannot carry out the desired operation when no clock is input. The other units in the apparatus interface shown in FIGS. 8 and 9 also require the clock for proper operation. Therefore, the processes of the apparatus interface are stopped when no clock is supplied thereto.

It is for this reason that the operation of the apparatus interface can be stopped and thus reduction in power consumption can be achieved by stopping the supply of the clock to the apparatus interface.

As has been described, the present invention will be appreciated by its merit to reduce power consumption of the transmission apparatus as a whole configured to include protection optical interface boards as well as working optical interface boards, by stopping the operation of the apparatus interface of the protection optical interface board and thus reducing power consumption of the protection optical interface board.

Further, the present invention is not limited to these embodiments, but various variations and modifications may be made without departing from the scope of the present invention.

What is claimed is:

1. A transmission line control system in combination with a transmission apparatus of a communication system having a redundant configuration and including a plurality of transmission apparatuses which are coupled via transmission lines of a working system and a protection system, the combination comprising:

each of said transmission apparatuses including interface boards each corresponding to each of the working and protection systems, respectively, each interface board including a transmission line signal processor which processes transmission signals exchanged with a respective transmission line, and an apparatus interface which provides an interface between the transmission apparatus and the transmission line signal processor; and a process stop controller, provided in each interface board and being coupled to said apparatus interface; and means for supplying to said process stop controller of a respective interface board a working/protection judging signal such that said process stop controller stops processes in the apparatus interface coupled thereto when said judging signal indicates that said process stop controller belongs to the interface board corresponding to the protection system so that power consumption in the communication system is reduced.

2. The transmission line control system as claimed in claim 1, wherein said process stop controller includes a power supply controller for controlling supply of power to said apparatus interface so that said power supply controller cuts off the power supply to said apparatus interface when said working/protection judging signal indicates that said power supply controller belongs to the interface board corresponding to the protection system.

3. The transmission line control system as claimed in claim 2, wherein said power supply controller includes a relay which operates when said working/protection judging signal indicates that said power supply controller belongs to the interface board corresponding to the protection system such that the operation of said relay causes the power supply to said apparatus interface to be cut off.

4. The transmission line control system as claimed in claim 2, wherein said power supply controller includes an analog switch which is operated when said working/protection signal indicates that said power supply controller belongs to the interface board corresponding to the protection system such that the operation of said analog switch causes the power supply to said apparatus interface to be cut off.

5. The transmission line control system in a redundant system as claimed in claim 1, wherein said process stop controller includes a clock supply controller for controlling supply of a clock to said apparatus interface so that said clock supply controller stops the supply of the clock to said apparatus interface when said working/protection judging signal indicates that said clock supply controller belongs to the interface board corresponding to the protection system.

6. The transmission line control system as claimed in claim 5, wherein said clock supply controller includes a selector which operates when said working/protection judging signal indicates that said clock supply controller belongs to the interface board corresponding to the protection system such that the operation of said selector causes the supply of the clock to said apparatus interface to be cut off.

7. An interface unit for a transmission apparatus of a communication system having a redundant configuration and including a plurality of transmission apparatuses which are coupled via transmission lines of a working system and a protection system, said interface unit comprising:

a transmission line signal processor for processing transmission signals exchanged with a transmission line;

an apparatus interface for providing an interface between the transmission apparatus and said transmission line signal processor; and a process stop controller coupled to said apparatus interface and being supplied with a working/protection judging signal to stop processes in said apparatus interface when said working/protection judging signal indicates that the interface unit belongs to the protection system so that power consumption in the communication system is reduced.

8. The interface unit as claimed in claim 7, wherein the interface unit is provided in each transmission apparatus of the working system and the protection system, respectively.

9. The interface unit as claimed in claim 7, wherein said process stop controller includes a power supply controller for controlling supply of power to said apparatus interface such that said power supply controller cuts off the power supply to said apparatus interface when said working/protection judging signal indicates that said power supply controller belongs to an interface board of the protection system.

10. The interface unit as claimed in claim 9, wherein said power supply controller includes a relay which operates when said working/protection judging signal indicates that the interface unit belongs to the protection system such that the operation of said relay causes the power supply to said apparatus interface to be cut off.

11. The interface unit as claimed in claim 9, wherein said power supply controller includes an analog switch which is operated when said working/protection signal indicates that the interface unit belongs to the protection system such that the operation of said analog switch causes the power supply to said apparatus interface to be cut off.

12. The interface unit as claimed in claim 7, wherein said process stop controller includes a clock supply controller for controlling supply of a clock to said apparatus interface such that said clock supply controller stops the supply of the clock to said apparatus interface when said working/protection judging signal indicates that said clock supply controller belongs to an interface board of the protection system.

13. The interface unit as claimed in claim 12, wherein said clock supply controller includes a selector which operates when said working/protection judging signal indicates that said clock supply controller belongs to the interface board of the protection system such that the operation of said selector causes the supply of the clock to said apparatus interface to be cut off.

14. The interface unit as claimed in claim 7, and further comprising an interface board on which said transmission line signal processor, said apparatus interface and said process stop controller are provided.

* * * * *